United States Patent [19]
Liao et al.

[11] Patent Number: 5,936,457
[45] Date of Patent: Aug. 10, 1999

[54] LIGHT SPOT POSITION-TO-PULSE WIDTH CONVERTER

[75] Inventors: Tai-Shan Liao, Taichung; Chun-Ming Chang, Taipei, both of Taiwan

[73] Assignee: National Science Council, Taipei, Taiwan

[21] Appl. No.: 08/901,582

[22] Filed: Jul. 28, 1997

[30] Foreign Application Priority Data

Aug. 8, 1996 [TW] Taiwan ................................ 85109680

[51] Int. Cl.[6] .................................................. H01L 31/00
[52] U.S. Cl. ...................... 327/514; 250/214 R; 356/218
[58] Field of Search .......................... 250/214 R, 214.1; 327/101, 103, 77, 78, 96, 514, 361; 356/218

[56] References Cited

U.S. PATENT DOCUMENTS

| 5,561,287 | 10/1996 | Turner .................................. 250/208.2 |
| 5,572,074 | 11/1996 | Standley ................................. 307/117 |
| 5,748,303 | 5/1998 | Korta ...................................... 356/229 |
| 5,773,816 | 6/1998 | Grodevant ........................... 250/214 R |
| 5,793,230 | 8/1998 | Chu et al. ................................. 327/77 |
| 5,804,997 | 9/1998 | Nishizono ............................... 327/103 |

OTHER PUBLICATIONS

U.S. Serial No. 08/880/866, filed Jun. 23, 1997, "Pulse Width Modulator Based on Detecting Difference of Light Beams," Liao and Chang.

U.S. Serial No. 08/762,955, filed Dec. 10, 1996, "Two Light Intensities Difference Convert Into Frequency Modulator For Parallel Photodiodes".

U.S. Serial No. , filed Jun. 10, 1997, A Devise and Method Capable of Converting a Position Signal into a Frequency Signal using a Photoelectric Position Sensitive Detector, Liao, et al.

*Primary Examiner*—Terry D. Cunningham
*Assistant Examiner*—Maria Hasanzadah
*Attorney, Agent, or Firm*—Frost & Jacobs LLP

[57] ABSTRACT

A converter for providing an electrical signal according to the status of a light spot applied thereto, comprises: a sensor for sensing the light spot and generating a position current according to the position of the light spot sensed thereat; and an operating circuit for providing the sensor with an operating current when the light spot is sensed by the sensor and for outputting a status current corresponding to the operating current. The sensor comprises two electrodes each providing a current with magnitude determined according to the distance between it and the position of the light spot sensed thereat. The position current is obtained by subtracting the first electrode current from the second electrode current. A pulse width modulator characterized by a narrow pulse generator is further included to output a sequence of pulses each with pulse width determined according to the position current and with cycle period determined according to the period of a sequence of narrow pulses generated by the narrow pulse generator.

14 Claims, 3 Drawing Sheets

LIGHT SPOT POSITION-TO-PULSE WIDTH CONVERTER

FIELD OF THE INVENTION

The present invention generally relates to a converter for providing electrical signals according to the status of a light spot applied thereto, and particularly to a converter for providing a pulse with pulse width determined according to the position of the light spot sensed thereat.

BACKGROUND OF THE INVENTION

It can be understood that some industries such as laser applications are in need of converting light spot position into electrical signals such as a pulse with pulse width determined according to the light spot position sensed thereat.

One typical scheme adopted by conventional art to convert a light spot position into an electrical signal such as a pulse with pulse width determined according to the sensed light spot position, is shown in FIG. 1 where the converter PSD converts a light spot position into two photo currents 1×1 and 1×2 respectively outputted from its two electrodes and determined according to the distances from the sensed light spot position to its two electrodes. These two photo currents are converted by operational amplifiers (OP AMP) A1 and A2 into voltages which are processed by two arithmetic circuits to provide a divider with two voltages (V×2−V×1) and (V×2+V×1). An signal (V×2−V×1)/(V×2+V×1) is then outputted by the divider in response to the two voltages, and is inputted to a voltage-to-pulse width converter which is thus able to provide a pulse with pulse width depending on the light spot position. It can be realized a simpler circuit shall be significant to some applications.

SUMMARY OF THE INVENTION

An object of the present invention is to provide a simpler circuit for conveniently converting a light spot position into an electrical signal such as a current with magnitude determined according to the light spot position, or a pulse with pulse width determined according to the light spot position.

One preferred embodiment of the present invention may be a converter comprising: a sensor for sensing the light spot and for generating a position current according to the position of the light spot sensed thereat; and an operating circuit for providing the sensor with an operating current when the sensor senses the light spot, and for outputting a status current corresponding to the operating current.

The sensor may comprise: a sensing area for sensing the light spot; a first electrode coupled with the sensing area for outputting a first electrode current with magnitude determined by the distance between the first electrode and the position of the light spot sensed in the sensing area; and a second electrode coupled with the sensing area for outputting a second electrode current with magnitude determined by the distance between the second electrode and the position of the light spot sensed in the sensing area, subtracting the first electrode current from the second electrode current is the position current.

Obviously the sensor may be so designed that the first electrode current is equal to the second electrode current if in the sensing area the distance between the position of the light spot sensed therein and the first electrode is approximately equal to that between the position of the light spot sensed therein and the second electrode.

The converter may further comprise a converter output pin coupled with the second electrode to receive the second electrode current and for outputting the position current, and a first mirror circuit for receiving the first electrode current from the first electrode and for sinking, from the converter output pin, a current with magnitude equal to the first electrode current, whereby the current which is outputted from the converter output pin is equal to the position current.

It can be realized the converter can be so configured that the operating circuit provides the operating current to the sensor when the light spot is sensed by the sensor no matter where the sensed position is, and the operating circuit comprises a second mirror circuit for outputting the status current with magnitude equal to that of the operating current, whereby the status current is provided by the operating circuit when the light spot is sensed by the sensor.

The converter may further comprise a current source for providing the converter output pin with a constant current, thereby the current outputted from the converter output pin is the sum of the position current and the constant current, the magnitude of the constant current is a constant larger than the maximum magnitude of the first electrode current, whereby the magnitude of the constant current is larger than the maximum magnitude of the position current, whereby the current outputted from the converter output pin is always positive.

The converter may further comprise a pulse width modulator for providing a modulated pulse with pulse width determined according to the current outputted from the converter output pin; and a switch means for receiving the modulated pulse and for outputting, in response to the status current, the modulated pulse, whereby the modulated pulse is outputted only when the light spot is sensed by the sensor.

Apparently the modulated pulse has its pulse width simply determined according to the position current because the magnitude of the constant current is a constant, thereby the modulated pulse having pulse width thereof determined according to the zero position current which results from that none of the light spot is sensed by the sensor instead of that the first electrode current is equal to the second electrode X2 current, can be prevented from being outputted.

The pulse width modulator may comprise:
  a switch (such as a transistor) comprising a control input pin (such as the base of a transistor), and a sink input pin (such as the collector of a transistor) coupled with the converter output pin, the switch for enabling the sink input pin to sink the current from the converter output pin when a control voltage is provided to the control input pin, and for disabling the sink input pin from sinking the current from the converter output pin when a voltage different from the control voltage is provided to the control input pin;
  a charge means (such as a capacitor) coupled with the converter output pin, for providing a charge voltage which, when the sink input pin is disabled from sinking the current from the converter output pin, is at a charge level rising with a rise rate determined by the magnitude of the current flowing thereto from the converter output pin, and which is at a discharge level when the sink input pin is enabled to sink the current from the converter output pin.
  a pulse oscillator for providing a sequence of narrow pulses;
  a comparator comprising a first compare input pin and a second compare input pin, and a compare output pin coupled with the control input pin of the switch, the first compare input pin for inputting the charge voltage, the second compare input pin for inputting the narrow pulse, the comparator for providing, in response to a voltage rise of the narrow pulse, the compare output pin with a width modulate voltage which is different from the control voltage (as explained above, the switch disables the sink input pin from sinking the current from the converter output pin when a voltage different from the control voltage is provided to the control input pin, and hence the charge voltage rises with a rise rate determined according to the current flowing to the charge means from the converter output pin), and for providing the compare output pin with the control voltage (thus enables the switch to sink current from the converter output pin, and in turn makes the charge voltage at dischagre level) when the charge voltage reaches the reference level which is higher than the discharge level. It can be seen the duration for the width modulate voltage to be maintained at the compare output pin can be deemed a pulse width and the current flowing to the charge means from the converter output pin is the current provided to the converter output pin by the sensor (the position current) and the current source (the constant current), whereby the pulse width of the pulse characterized by both the width modulate voltage (low, for example) and the control voltage (high, for example) at the compare output pin is determined according to the magnitude of the current corresponding to the position current which is determined according to the position of the light spot sensed by the sensor.

It can be seen the period of the modulated pulses (sum of durations for both the modulate voltage and the control voltage) is always equal to that of the narrow pulse.

The present invention may best be understood through the following description with reference to the accompanying drawings, in which:

DETAILED DESCRIPTION OF THE PREFERRED EMBODIMENTS

Figure 1:
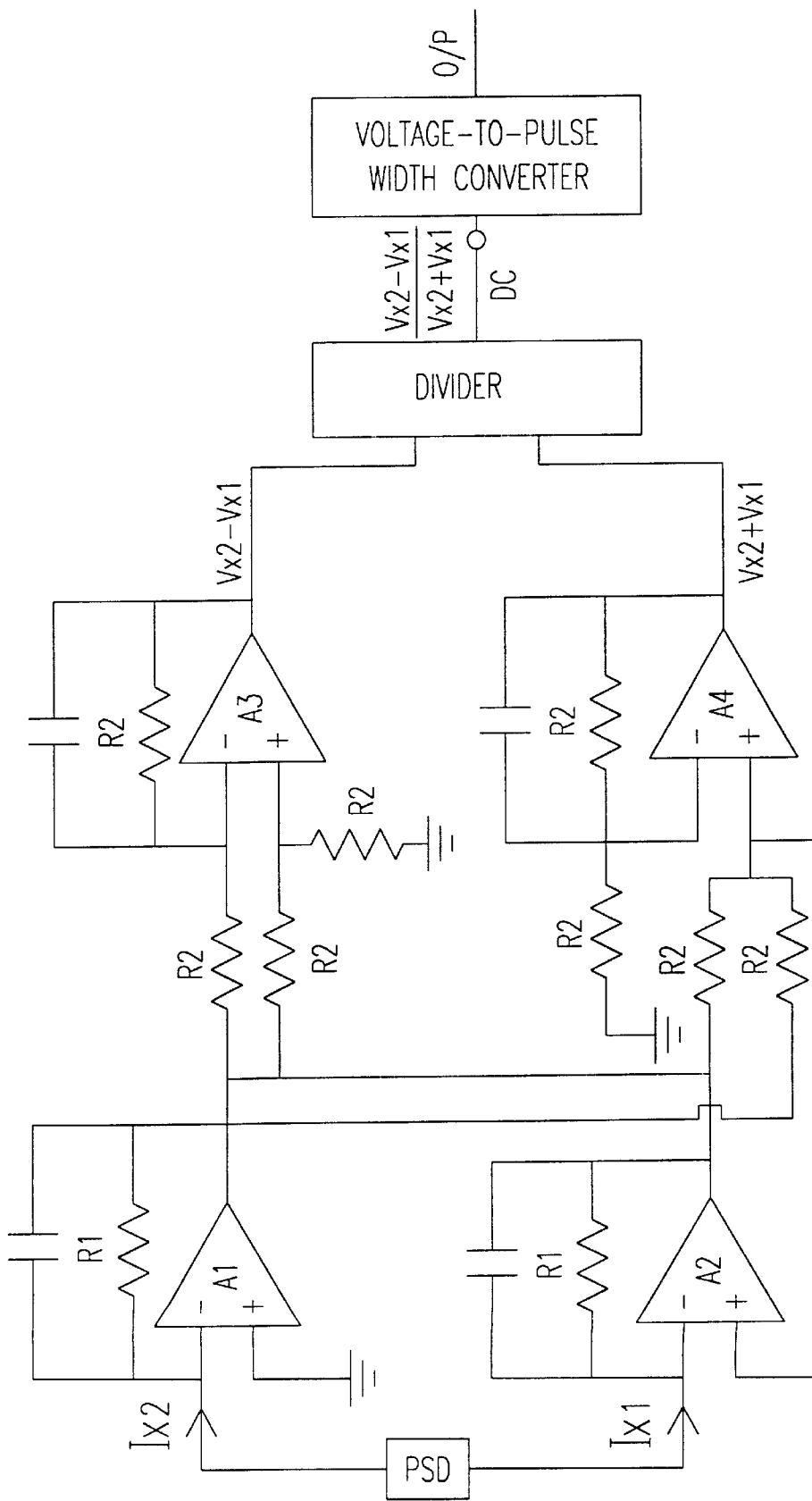
FIG. 1 is a diagram showing a conventional circuit for converting light spot position into electrical signals.
Figure 2:
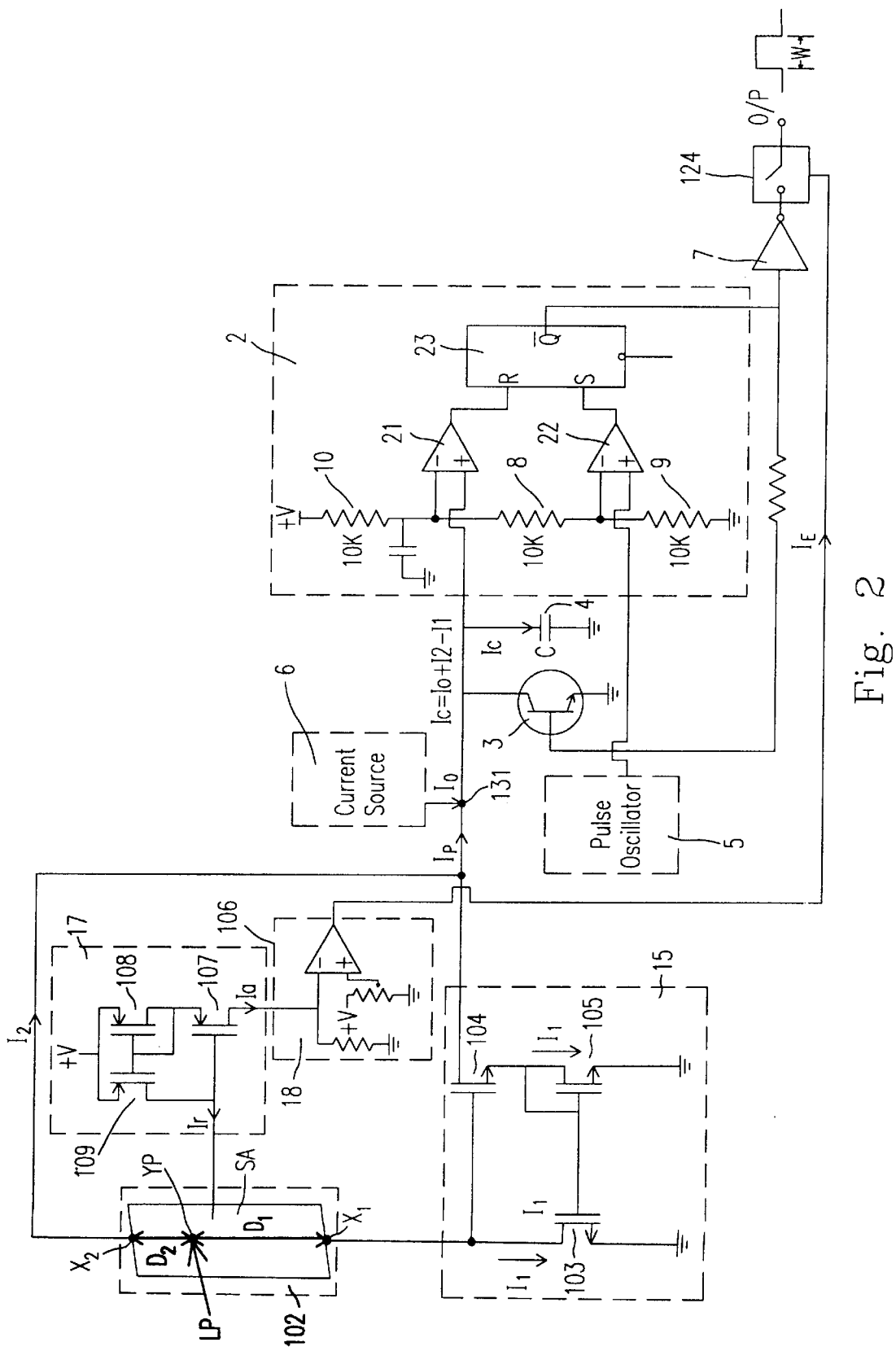
FIG. 2 is a circuit diagram illustrating one preferred embodiment of the converter according to the present invention.

In FIG. 2, the sensor 102 is for sensing the light spot LP and for generating a position current Ip (obtained by subtracting the current I1 from I2 where I1 is provided by a first electrode X1 thereof and I2 is provided by a second electrode X2 thereof) according to the position YP of the light spot LP sensed thereat, the operating circuit 17 is for providing the sensor 102 with an operating current Ir when sensor 102 senses the light spot LP and for outputting a status current Ia corresponding to the operating current Ir.

The sensor 102 may comprise: a sensing area SA for sensing the light spot LP, a first electrode X1 coupled with the sensing area SA for outputting a first electrode current I1 with magnitude determined according to the distance D1 between the first electrode X1 and the position YP of the light spot LP sensed in the sensing area SA, and a second electrode X2 coupled with the sensing area SA for outputting a second electrode current I2 with magnitude determined according to the distance D2 between the second electrode X2 and the position YP of the light spot LP sensed in the sensing area SA, position current Ip is obtained by subtracting the first electrode current I1 from the second electrode current I2.

Obviously the sensor 102 may be so designed that the first electrode current I1 is equal to the second electrode current I2 if in the sensing area SA the distance D1 between the position YP of the light spot LP sensed therein and the first electrode X1 is approximately equal to the distance D2 between the position YP of the light spot LP sensed therein and the second electrode X2.

The converter may further comprise a converter output pin 131 coupled with the second electrode X2 to receive the second electrode current I2 and capable of outputting the position current Ip, and a first mirror circuit 15 for receiving the first electrode current I1 from the first electrode X1 and for sinking, from the converter output pin 131, a current with magnitude equal to the first electrode current I1, whereby the sum of the current received by the converter output pin 131 and available for outputting is equal to the position current Ip.

It can be realized the converter can be so configured that the operating circuit 17 provides the operating current Ir to the sensor 102 when the light spot is sensed by the sensor 102 no matter where the sensed position YP is, and the operating circuit 17 comprises a second mirror circuit including three p-channel field effect transistors 107, 108, and 109, for outputting the status current Ia having a magnitude equal to that of the operating current Ir, whereby the status current Ia is provided by the operating circuit 17 only when the light spot is sensed by the sensor.

The first mirror circuit 15 comprises three n-channel field effect transistors of which the first one 103 has drain thereof coupled with the the first electrode X1 and source thereof coupled with the ground terminal of a power source having V+ terminal to supply power for operating circuit 17 to provide operating current Ir , the second one 104 has gate thereof coupled with the first electrode X1 and drain thereof coupled with the converter output pin 131, the third one 105 has gate and drain thereof coupled with the source of the second one 104, gate thereof coupled with the gate of the first one 103, and source thereof coupled with the ground terminal of the power source having V+ terminal to supply power for operating circuit 17 to provide operating current Ir.

The second mirror circuit 17 comprises three p-channel field effect transistors of which the first one 107 has drain thereof for outputting the status current Ia and gate thereof coupled with the sensor 102, the second one 108 has gate and drain thereof coupled with the source of the first one 107 and source thereof coupled with the positive terminal +V of the power source, the third one 109 has drain thereof coupled with the gate of the first one 107, gate thereof coupled with the gate of the second one 108, and source thereof coupled with the positive terminal +V of the power source.

The converter further comprises a current source 6 for providing the converter output pin 131 with a constant current Io , thereby the sum of the current received by aid converter output pin 131 and available for outputting is the sum of the position current Ip and the constant current Io , the magnitude of the constant current Io is a constant larger than the maximum magnitude of the first electrode current I1, whereby the magnitude of the constant current Io is larger than the maximum magnitude of the position current Ip, whereby the current outputted from the converter output pin 131 is always positive.

The converter may further comprise a pulse width modulator which includes a pulse oscillator 5, a switch such as a transistor 3, a charge means such as a capacitor 4, and a comparator 2. The pulse width modulator provides a modulated pulse with pulse width determined according to the current outputted from the converter output pin 131. The converter also further comprises a switch means 124 for receiving the modulate pulse via an inverter 7 and for outputting, in response to the status current Ia (turned on by status current Ia, for example), the modulated pulse, whereby the modulated pulse is outputted only when the light spot LP is sensed by the sensor 102. It can be realized that, besides further comprising the pulse width modulator and the switch means 124, the converter may also be configured to further comprise a monitoring circuit 18 for providing, in response to the status current Ia provided by second mirror circuit 17, an active signal Ie (either voltage signal or current signal) to turn on the switch means 124. In this case the status current Ia for turning switch 124 on is replaced by the active signal Ie.

Apparently the modulated pulse has its pulse width simply determined according to the position current Ip because the magnitude of the constant current Io is a constant, thereby the modulated pulse which has pulse width thereof determined by zero position current (Ip=0) which results from that no light spot is sensed by the sensor 102 instead of that the distance between the sensed position of the light spot and the first electrode is equal to the distance between the sensed position of the light spot and the second electrode, can be prevented from being outputted.

Switch 3 (a transistor) comprises a control input pin (base), and a sink input pin (collector) coupled with the converter output pin 131, the switch enables the sink input pin to sink the current from the converter output pin 131 when a control voltage is provided to the control input pin, and disables the sink input pin from sinking the current from the converter output pin 131 when a voltage different from the control voltage is provided to the control input pin;

Charge means 4 is coupled with the converter output pin 131, for providing a charge voltage (such as the voltage across a capacitor) which, when the sink input pin is disabled from sinking the current from the converter output pin 131, is at a charge level rising with a rise rate determined by the magnitude of the current flowing thereto from the converter output pin 131, and which is at a discharge level when the sink input pin is enabled to sink the current from the converter output pin 131.

Figure 3:
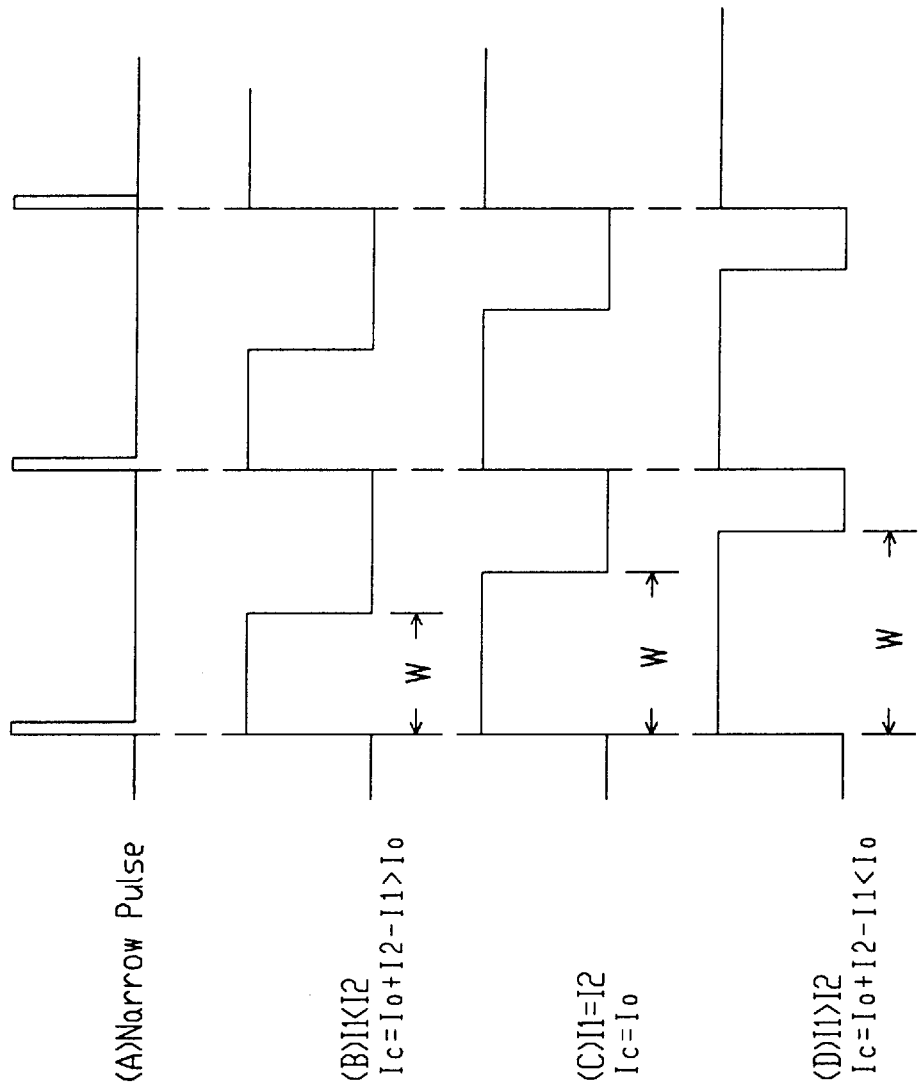
FIG. 3(A) shows an example of narrow pulse and FIG. 3(B), 3(C), and 3(D) show three types of pulse width corresponding to different relations (=, >, <) between the currents I1 and I2 provided by the sensor in the preferred embodiment of the converter.

Pulse oscillator 5 is for providing a sequence of narrow pulses as shown in FIG. 3(A);

Comparator 2 comprises a first compare input pin (+pin of operational amplifier 21) and a second compare input pin (+pin of operational amplifier 22), and a compare output pin (output +e,dus pin Q of flip-flop 23) coupled with the control input pin of the switch 3, the first compare input pin is for inputting the charge voltage, the second compare input pin is for inputting the narrow pulse provided by pulse oscillator 5, the comparator is for providing, in response to a voltage rise of the narrow pulse, the compare output pin with a width modulate voltage which is different from the control voltage, and for providing the compare output pin with the control voltage when the charge voltage reaches the reference level which is higher than the discharge level.

It can also be seen from FIG. 2 that Comparator 2 includes a first operational amplifier 21 having positive input pin coupled with the converter output pin and negative input pin inputting a first reference voltage V1, a second operational amplifier 22 having negative input pin inputting a second reference voltage V2 and positive input pin inputting the narrow pulse provided by narrow pulse oscillator 5, a flip-flop 23 with input pin R to receive the voltage provided by first operational amplifier 21, input pin S to receive the voltage provided by second operational amplifier 22, and an output pin Q (inverse of Q, titled as compare output pin) to output at least two different voltages. It shall be understood comparator 2 can be so designed that first operational amplifier 21 provides a high voltage when the charge voltage raises to reach the first reference voltage V1, and provides a low voltage when the charge voltage is below V1; the second operational amplifier 22 provides a responding voltage rise in response to a voltage rise of the narrow pulse which exceeds the second reference voltage V2; the flip-flop 23 provides, when the first operational amplifier 21 is providing low voltage, the compare output pin Q with the width modulate voltage in response to the responding voltage rise, and provides the compare output pin Q with the control voltage in response to the high voltage provided by the first operational amplifier 21, whereby the width modulate voltage is provided to the compare output pin Q in response to a voltage rise of the narrow pulse and maintained thereat until the high voltage is provided by the first operational amplifier 21 as a result of that the charge voltage reaches the reference level. It can be seen the duration for the width modulate voltage to be maintained at the compare output pin Q can be deemed a pulse width and the current flowing to the charge means from the converter output pin 131 is the current provided to the converter output pin 131 by the sensor 102 (the position current) and the current source 6 (the constant current), whereby the pulse width of the pulse characterized by both the width modulate voltage (low, for example) and control voltage (high, for example) at the compare output pin Q is determined according to the magnitude of the current corresponding to the position current Ip which is determined according to the position YP of the light spot LP sensed by the sensor 102.

The pulse width modulator may further comprise an inverter 7 for providing a pulse output which is the inverse of the voltage at the compare output pin. Obviously the width of the high voltage pulse of the pulse output is the duration for the width modulate voltage to be maintained at the compare output pin, and hence is modulated according to the magnitude of the position current Ip corresponding to the position YP of the light spot LP sensed by the sensor 102.

In FIG. 3(B), 3(C), and 3(D), I1, I2, Io are respectively the current provided by the first electrode X1, second electrode X2, and current source 6, and Ic is the total current (the sum of the current)provided to the converter output pin 131 shown in FIG. 2. It can be seen the period of the modulated pulses (sum of durations for high voltage and low voltage) respectively shown in FIG. 3(B), 3(C), 3(D) is always equal to that of the narrow pulses shown in FIG. 3(A).

In conclusion, the period of the narrow pulses determines the period of the modulated pulses while the sum of the current (Io from constant current source 6 and Ip from sensor 102) provided to the converter output pin 131 determines the pulse width of the modulated pulses.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A converter for providing an electrical signal according to a position of a light spot applied thereto, comprising:
   a sensor for sensing said light spot and generating a position current according to said position of said light spot sensed thereat;
   an operating circuit for providing said sensor with an operating current and for outputting a status current corresponding to said operating current when said light spot is sensed by said sensor; and
   a pulse width modulator electrically connected to said sensor and said operating circuit for providing said electrical signal being a modulated pulse according to said position current.

2. The converter according to claim 1 wherein said sensor comprises:
   a sensing area for sensing said light spot;
   a first electrode coupled with said sensing area for outputting a first electrode current with magnitude determined according to the distance between said first electrode and said position of said light spot sensed in said sensing area; and
   a second electrode coupled with said sensing area for outputting a second electrode current with magnitude determined according to the distance between said second electrode and said position of said light spot sensed in said sensing area, wherein by subtracting said first electrode current from said second electrode current, said position current is obtained.

3. The converter according to claim 2 wherein said first electrode current is equal to said second electrode current if in said sensing area the distance between said position of said light spot sensed therein and said first electrode is equal to that between said position of said light spot sensed therein and said second electrode.

4. The converter according to claim 3 further comprising:
   a converter output pin receiving said second electrode current from said second electrode;
   a first mirror circuit for receiving said first electrode current from said first electrode and sinking, from said converter output pin, a current with magnitude equal to said first electrode current, whereby the sum of the current received by said converter output pin is equal to said position current.

5. The converter according to claim 1 wherein said operating current is provided to said sensor when said light spot is sensed by said sensor, and wherein said operating circuit comprises a second mirror circuit for outputting said status current with magnitude equal to that of said operating current, whereby said status current is provided by said operating circuit when said light spot is sensed by said sensor.

6. The converter according to claim 4 wherein said first mirror circuit comprises three n-channel field effect transistors of which the first one has drain thereof coupled with said first electrode and source thereof coupled with the ground terminal of a power source, the second one has gate thereof coupled with said first electrode and drain thereof coupled with said converter output pin, the third one has gate and drain thereof coupled with the source of said second one, gate thereof coupled with the gate of said first one, and source thereof coupled with the ground terminal of said power source.

7. The converter according to claim 5 wherein said second mirror circuit comprises three p-channel field effect transistors of which the first one has drain thereof for outputting said status current and gate thereof coupled with said sensor, the second one has gate and drain thereof coupled with the source of said first one and source thereof coupled with the positive terminal of a power source, the third one has drain thereof coupled with the gate of said first one, gate thereof coupled with the gate of said second one, and source thereof coupled with the positive terminal of said power source.

8. The converter according to claim 4 further comprising a current source for providing said converter output pin with a constant current, thereby said sum of the current received by said converter output pin is the sum of said position current and said constant current, the magnitude of said constant current is a constant larger than the maximum magnitude of said first electrode current, whereby the magnitude of said constant current is larger than the maximum magnitude of said position current, whereby the sum of the current received by said converter output pin is positive.

9. The converter according to claim 8 wherein said pulse width modulator has a pulse width determined according to said sum of the current received by said converter output pin.

10. The converter according to claim 8 further comprising:
    a monitoring circuit for providing an active signal in response to said status current; and
    a switch means for receiving said modulated pulse and outputting, in response to said active signal, said modulated pulse, whereby said modulated pulse is outputted only when said light spot is sensed by said sensor.

11. The converter according to claim 9 wherein said pulse width is determined according to said position current because the magnitude of said constant current is constant, thereby said modulated pulse having said pulse width thereof determined according to said position current which is zero due to that no said light spot is sensed by said sensor instead of that said distance between said position of said light spot and said first electrode is equal to said distance between said position of said light spot and said second electrode is prevented from being outputted.

12. The converter according to claim 11 wherein said pulse width modulator comprises:
    a switch comprising a control input pin, and a sink input pin coupled with said converter output pin, said switch enabling said sink input pin to sink the current from said converter output pin when a control voltage is provided to said control input pin, and disabling said sink input pin from sinking the current from said converter output pin when a voltage different from said control voltage is provided to said control input pin;
    a charge means coupled with said converter output pin, for providing a charge voltage which, when said sink input pin is disabled from sinking the current from said converter output pin, is at a charge level rising with a rise rate determined by the magnitude of the current flowing thereto from said converter output pin, and which is at a discharge level when said sink input pin is enabled to sink the current from said converter output pin;
    a pulse oscillator for providing a sequence of narrow pulses; and
    a comparator comprising a first compare input pin and a second compare input pin, and a compare output pin coupled with said control input pin of said switch, said first compare input pin inputting said charge voltage, said second compare input pin inputting said narrow pulse, said comparator providing, in response to a voltage rise of said narrow pulse, said compare output pin with a width modulate voltage which is different from said control voltage, and providing said compare output pin with said control voltage when said charge voltage reaches said reference level which is higher than said discharge level.

13. The converter according to claim 9 further comprising a switch means for receiving said modulator pulse and outputting, in response to said status current, said modulated pulse, whereby said modulated pulse is outputted only when said light spot is sensed by said sensor.

14. A converter for providing an electrical signal according to the status of a light spot applied thereto, comprising:

- a sensor for sensing said light spot and generating a position current according to the position of said light spot sensed thereat;
- an operating circuit for providing said sensor with an operating current when said light spot is sensed by said sensor and for outputting a status current corresponding to said operating current;
- a pulse width modulator electrically connected to said sensor and said operating circuit for providing a modulated pulse according to said position current; and
- said pulse width modulator having for receiving said modulated pulse and outputting, in response to said status current, said modulated pulse, whereby said modulated pulse is outputted only when said light spot is sensed by said sensor.

* * * * *

UNITED STATES PATENT AND TRADEMARK OFFICE
CERTIFICATE OF CORRECTION

PATENT NO. : 5,936,457
DATED : August 10, 1999
INVENTOR(S) : Tai-Shan Liao
Chun-Ming Chang It is certified that error appears in the above-indentified patent and that said Letters Patent is hereby corrected as shown below:

Column 10, line 11 (claim 14) please insert - -a switch means- - directly after the word "having"

Signed and Sealed this

Twenty-eighth Day of December, 1999

Attest:

Q. TODD DICKINSON

Attesting Officer

Acting Commissioner of Patents and Trademarks